March 1, 1949.   H. W. PRICE   2,462,994
POWER STEERING MECHANISM
Filed March 14, 1946   3 Sheets-Sheet 1

INVENTOR.
HAROLD W. PRICE.

March 1, 1949.  H. W. PRICE  2,462,994
POWER STEERING MECHANISM
Filed March 14, 1946  3 Sheets-Sheet 2

INVENTOR.
HAROLD W. PRICE.
BY
H. O. Clayton

Inventor
HAROLD W. PRICE.
By H. E. Clayton
Attorney

Patented Mar. 1, 1949

2,462,994

UNITED STATES PATENT OFFICE 2,462,994

POWER STEERING MECHANISM

Harold W. Price, Bradenton, Fla., assignor to Bendix Aviation Corporation, South Bend, Ind., a corporation of Delaware Application March 14, 1946, Serial No. 654,231

10 Claims. (Cl. 180—79.2)

The present invention relates in general to steering mechanism and more particularly to a novel and improved fluid pressure operated steering mechanism adapted for use with automotive vehicles.

Attempts have been made to develop efficient power steering mechanism for motor vehicles employing fluid pressure motors controlled by follow-up valve mechanisms operable by the steering wheel and by the action of the fluid pressure motor so that a given turning movement of the steering wheel will be followed by a proportional operation of the fluid pressure motor, the motor causing a follow-up action of the valve mechanism. Now these devices have been found to be operable but not commercially satisfactory and accordingly have never come into commercial use to an appreciable extent. There are several reasons for the unsatisfactory operation of mechanisms of this type, however, one of the principal reasons is the complexity of the mechanism.

It is, therefore, the principal object of my invention to provide a very simple, compact and effective steering mechanism including a pressure differential operated motor, controlled by a follow-up valve, said valve being referred to above.

Yet another object of my invention is to provide a combined manually and power operated steering mechanism for automotive vehicles which is operative to effect a manual operation of the steering wheels in the event of failure of the power means of said mechanism.

In accordance with a preferred embodiment of my invention, there is provided a manually and power operated steering mechanism which is in many respects similar to conventional steering mechanism, said invention including the usual steering wheels, the gear mechanism mounted at the base of the steering column and a pitman arm together with a fluid pressure operated motor having a follow-up control valve mounted therein and force transmitting means interconnecting the aforementioned gear mechanism, the control valve, the power element of the motor and said pitman arm. A further object of my invention is to include yieldable means as a part of the latter force transmitting means whereby there is provided means operable, when a predetermined resistance to movement of the steering wheel is encountered, to effect an opening of the aforementioned valve to thereby effect an energization of the aforementioned motor.

Yet another object of my invention is to provide a compact, dual motor unit, the control valve therefore being housed within one of the motors of said unit.

Other objects and advantages of the invention will be readily apparent to those skilled in the art from the following description taken in conjunction with the accompanying drawing which represent certain embodiments of my invention. After considering these embodiments, skilled persons will understand that many variations may be made without departing from the principles disclosed, and I contemplate the employment of any structures, arrangements or modes of operation that are properly within the scope of the appended claims.

Figure 1:
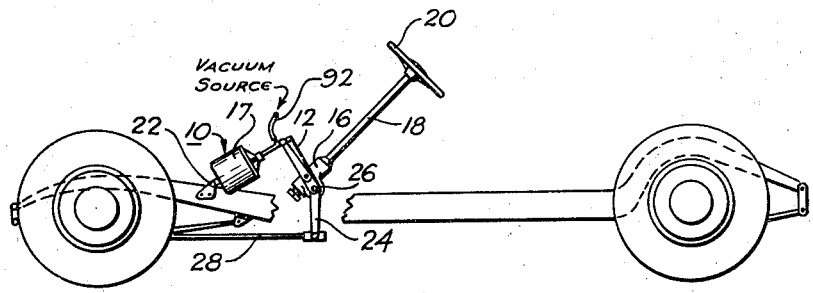
Figure 1 is a view disclosing a part of the steering mechanism of an automotive vehicle, the power and manually operated mechanism constituting my invention being incorporated therein.
Figure 4:
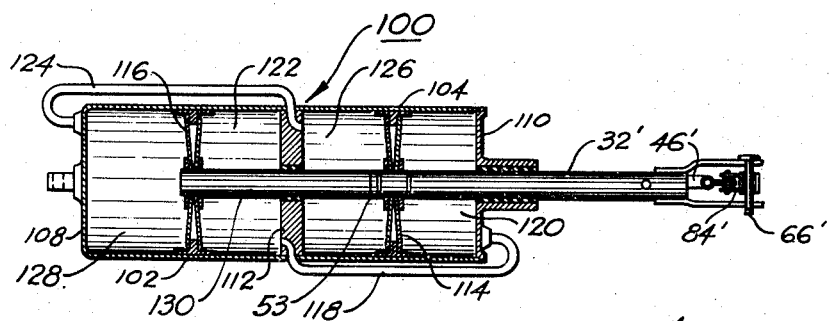
Figure 5:
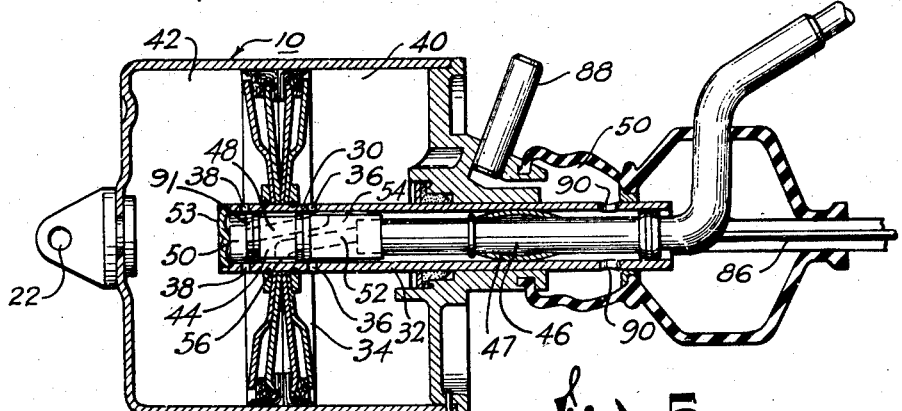
Figure 6:
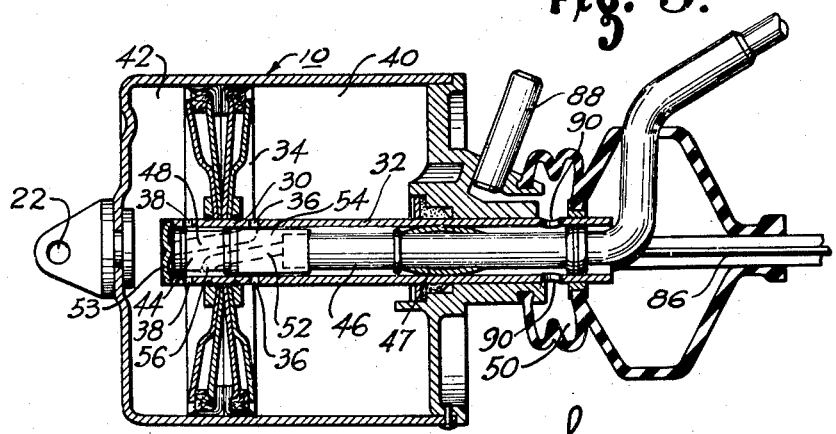
Figure 7:
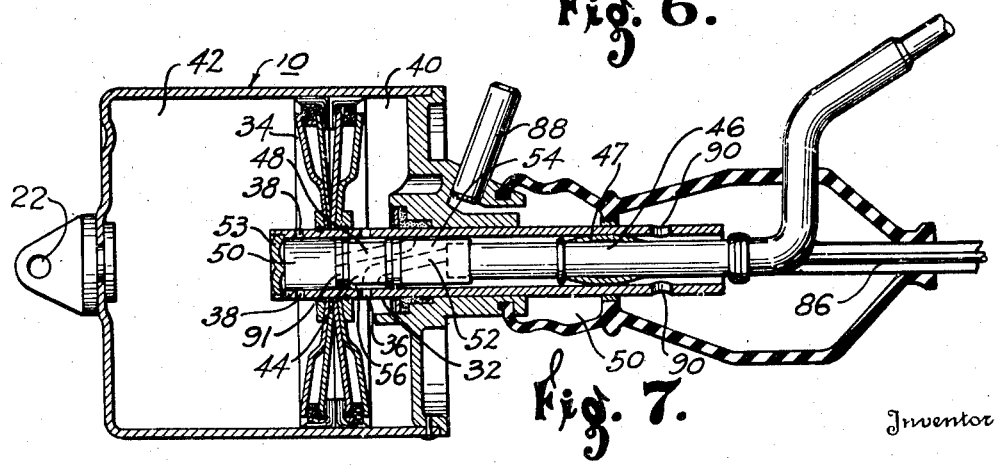

Figure 4 is a sectional view of a pressure differential operated motor unit which may be used with the steering mechanism of my invention; and Figures 5, 6 and 7 are sectional views of another pressure differential operated motor unit which may be used in the steering mechanism of my invention, said views disclosing the power element of said motor and the control valve therefore in three of their operative positions Referring now to Figure 1 of the drawings disclosing the principal features of my invention, a double-acting pressure differential operated motor 10 disclosed in detail in Figures 5, 6 and 7, is operatively connected, by the hereinafter described linkage 12 and a manually operated shaft member 14, to the usual reduction gearing 16 mounted at the base of a steering column 18. This gearing, which may be of the worm and sector type and to which no claim is made, is operatively connected to a steering wheel 20; and the casing 17 of the aforementioned motor 10 is preferably pivotally mounted at 22 to a part of the chassis of the vehicle. A lever 24 or so-called pitman arm, rotatably mounted on a stub shaft member 26 protruding from and fixedly secured to the end of the shaft member 14, is pivotally connected to the usual drag link 28 of the conventional steering mechanism of the vehicle. The shaft members 14 and 26 together constitute a manually operated drive shaft inasmuch as said members are fixedly connected together and rotate as one.

Figure 2:
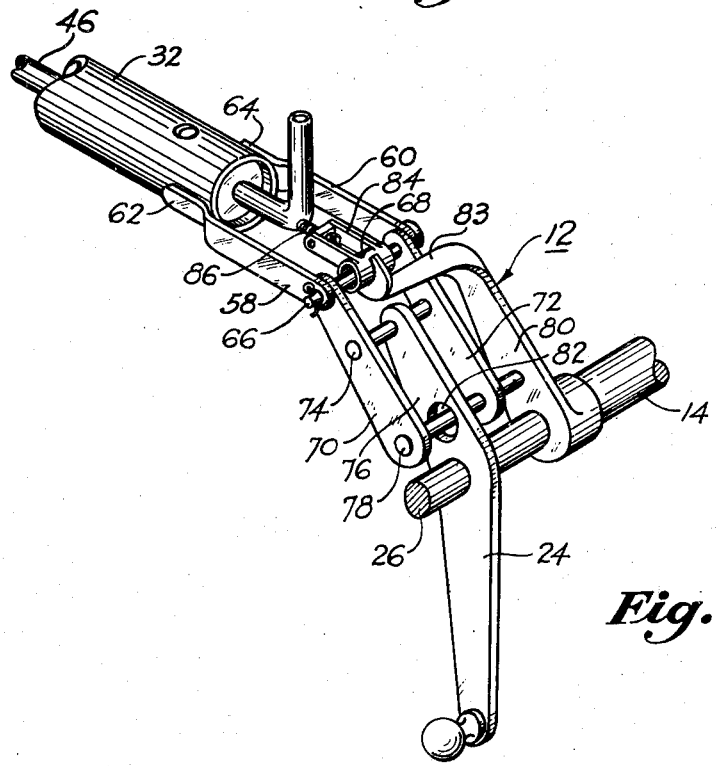
Figure 2 is a view disclosing force transmitting linkage of one embodiment of my invention, said linkage interconnecting the pressure differential operated motor, the pitman arm of the steering mechanism and the steering wheel operated gears usually mounted at the base of the steering column.

Now, one embodiment of my invention resides in the compact force transmitting linkage disclosed in Figure 2, said linkage serving to connect the aforementioned worm and sector gearing, the pitman arm and a two-part control valve of the motor 10 said valve being housed within said motor.

Referring to Figures 5, 6 and 7, one of the two parts of the aforementioned valve constitutes the ported end portion 30 of a hollow rod 32, said portion fitting within the hub portion of the power element 34 of the motor. The ports within this valve member 30 are indicated by the reference numerals 36 and 38, the ports 36 serving to interconnect the interior of the rod 32 with a compartment 40 of the motor and the ports 38 serving to interconnect the interior of said rod with a compartment 42 of said motor. The other part of the two-part control valve is slidably mounted within the hollow rod 32 and said valve part constitutes a spool-shaped member 44 connected to the outer end of a tube 46 which is connected to a source of vacuum preferably the intake manifold of the engine of the vehicle. A duct 48 within the valve member 44 serves to interconnect the interior of the rod and a compartment 50 outlined by a wall 53 in the end of the rod 32, the end of said valve member and the end portion of said rod; and a duct 52 within the valve member 44 and extending through a portion 54 to which the tube 46 is connected, serves to interconnect the interior of said tube with a compartment or recess 56 outlined by the small diametered portion of the spool valve member 44 and the inner wall of the valve member 30. Relative motion between the tube 46 and rod 32 effects an operation of the control valve and a severe jarring of the vehicle, such as is caused by driving on a rough road, may effect this result. To obviate this undesired operation of the mechanism there may be included a bent wire member 47 sleeved over the rod 46 and yieldably contacting the interior of the rod 32; and this member will increase the frictional resistance to motion of the rod with respect to the tube.

Describing now the aforementioned linkage constituting the preferred embodiment of my invention, links 58 and 60, which are fixedly secured to the piston rod 32 at 62 and 64 respectively, are provided at their outer ends with openings to receive a pin 66 which extends through a tubular-shaped thrust member 68; and the pin 66 also extends through the upper ends of so-called reaction levers 70 and 72 which are pivotally connected by a pin 74, with the upper portion 76 of the pitman arm 24. The diameter of the pin 66 and the inside diameter of the thrust member 68 are such as to provide lost motion connection between said parts. As is disclosed in Figure 2 the portion 76 of the pitman arm is straddled by the levers 70 and 72 and a thrust pin 78, interconnecting the lower ends of said levers and extending into a crank 80, passes through a relatively large opening 82 in the portion 76. The crank 80, which is non-rotatably mounted on the shaft 14, is bent outwardly at its outer end to provide a portion 83, said portion being preferably U-shaped at its end to fit around the thrust member 68; and to the latter member there is secured a U-shaped member 84 which is adjustably connected to a pin 86 secured to and extending from the vacuum tube 46.

Describing in detail the operation of the above described power and manually operated steering mechanism of my invention, it will be assumed that the front wheels of the vehicle are in their straight ahead position and that in this position the power element 34 and the valve parts 30 and 44 take the positions disclosed in Figure 5 of the drawings. Now, it will be noted from an inspection of the latter figure that in this position of the parts both motor compartments 42 and 40 are vented to the atmosphere via a nipple 88 connected to an air cleaner, not shown, ports 90 in the rod 32, the interior of said rod, the ports 36 and 38 in the valve member 30 and the duct 48.

To effect a right turn operation of the front wheels the steering wheel is, of course, rotated to the right, that is in a clockwise direction; and this operation serves, shall we say, to rotate the crank 80 in a counterclockwise direction to move the valve member 44 to the left. The valve parts then assume the relative positions disclosed in Figure 6, the motor compartment 42 being connected to the source of vacuum via the ports 38, the recess 56, the duct 52 and the tube 46; and the motor compartment 40 is at the same time vented to the atmosphere via the ports 36, the interior of the tube 32, the ports 90, the nipple 88 and the air cleaner.

The piston 34 is, by this operation, subjected to a differential of pressures resulting in its being moved to the position disclosed in Figure 6 to effect the right turn operation of the front wheels. In this operation the load from the piston is transferred to the pitman arm 24 through the intermediary of the reaction levers 70 and 72, said levers being pivotally connected to the pitman arm by means of the pin 74; and it is apparent therefore from an inspection of Figure 2 that in this operation the driver must exert a force upon the crank 80 to offset the force from the levers 70 and 72 exerted by means of the pin 78. This force, known in the art as feel, together with the force being at the time exerted by the piston 34, serves to effect the rotation of the pitman arm to effect the right turn operation of the front wheels. The proportioning of the aforementioned two forces acting to rotate the pitman arm is, of course, determined by the moment arms of the reaction levers; and it is to be noted that at all times during this operation the force exerted by the driver upon the pin 78 is directly proportional to the force being exerted by the motor 10 upon the pin 74. It follows, therefore, that the driver 's at all times during the power operation of the mechanism, conscious of the force being exerted by the motor 10 in effecting the steering operation.

If, after the valve 30, 44 is opened and the motor energized, the driver arrests the right turn movement of the steering wheel then there results a so-called follow-up operation of said valve. Explaining this operation, the arresting of the movement of the steering wheels results in the arresting of the movement of the valve member 44, however, the piston 34 and the valve member 30 connected thereto continue to move until the ports 38 are covered by a land portion 91 of said valve member. The withdrawal of air from the compartment 42 is then interrupted and the movement of the piston is stopped. The valve is, by this so-called follow-up operation, then said to be lapped and the system is in equilibrium. To resume the right turn steering movement of the front wheels the driver then resumes the rotation of the steering wheel, said operation serving to again open the valve 30, 44 to again effect an energization of the motor 10.

There is thus provided by the manual and power operated mechanism of Figures 1, 2, 5, 6 and 7 a simple and compact mechanism for effecting the steering operation of the front wheels of an automotive vehicle. The cluster of links 12, disclosed in Figure 2, provides a mechanism whereby the driver is at all times during the operation of the motor advised of the force being exerted by said motor; and the operation of said motor may be arrested, at any time, by merely arresting the turning movement of the steering wheel. If the power means of my invention should fail during the above described operation, then the driver may effect the steering operation solely by his physical effort by merely taking up all lost motion in the linkage of Figure 2. Explaining this operation; the thrust member 68 contacts the pin 66 and the force exerted by the driver is thus transmitted to the pitman arm through the pin 74. This manual operation of the steering mechanism is also made possible when the driver chooses such an operation by cutting off the vacuum supply; and this may be effected by the operation of a cut-off valve incorporated in the vacuum conduit 92.

A right turn operation of the steering mechanism has been described above; however, it will be obvious from an inspection of Figure 2 that a left turn operation of the mechanism may be effected by rotating the steering wheel in a counterclockwise direction which will, of course, effect a clockwise rotation of the crank 80.

Figure 3:
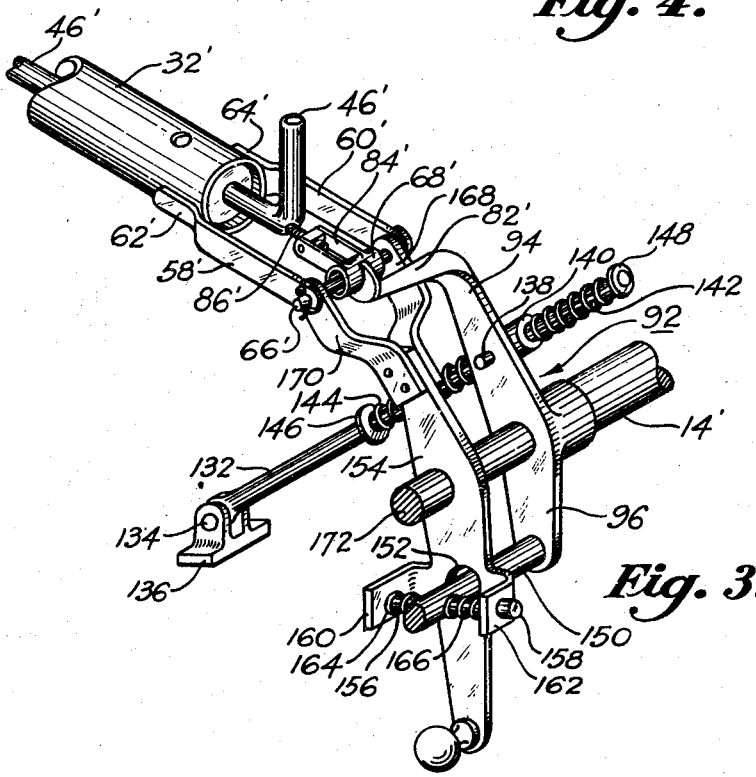
Figure 3 is a view similar to Figure 2 disclosing the force transmitting linkage of another embodiment of my invention.

There is disclosed in Figure 3 another embodiment of my invention; and this embodiment includes a shaft 14' rotated by the above described worm and sector or equivalent gearing mounted at the base of the steering column. A lever member 92, including arms 94 and 96, is drivably connected to the shaft 14' and said member, as with the crank member 80 of Figure 2, is turned outwardly at the outer end to provide a flange 82'. The latter flange is shaped at its end to fit around a tubular-shaped thrust member 68' that is adjustably connected, by a U-shaped member 84' and a pin 86', with a vacuum tube 46'. At this juncture it is to be noted that those parts of the mechanism of Figure 3 that duplicate like parts in the mechanism of Figure 2 are given the same reference numeral with the addition of a prime; and it is also to be noted that a motor unit 100 disclosed in Figure 4 may be combined with the force transmitting linkage disclosed in either Figure 2 or Figure 3. Now the motor unit of Figure 4 includes the motors 102 and 104, the latter duplicating the previously described motor disclosed in Figures 5, 6 and 7.

Describing in detail the motor unit in Figure 4 the same includes a casing having end walls 108 and 110, a central partition 112 and pistons 114 and 116 to the right and left, respectively, of said partition. Fluid transmitting means, preferably a conduit 118, serves to interconnect a compartment 120 of the motor 104 with a compartment 122 of the motor 102; and fluid transmitting means, preferably a conduit 124, serves to interconnect a compartment 126 of the motor 104 with a compartment 128 of the motor 102. The piston 116 of the motor 102 is fixedly connected to the end of an extension rod 130 which is secured to the end wall 53 of the hollow tube 32. There are thus provided the aforementioned motors 104 and 102, the latter being energized simultaneously with or substantially simultaneously with the motor 104.

Means are provided for turning the valve operating lever 92 to its neutral position, Figure 3, that is the position effecting an operation of the motor to place the front wheels in their straight ahead position; and this means includes a rod 132 pivotally mounted at 134 to a member 136 which may be secured to some part of the chassis of the vehicle. A pin 138 secured to the lever arm 94 extends within a tubular member 140 which is sleeved over the rod 132; and so-called caster springs 142 and 144, interposed between the member 140 and stops 146 and 148 secured to said rod, serve to bias the lever 92 to the aforementioned neutral position.

A pin 150, secured to the lower end of and extending laterally from the lever arm 96, extends through an opening 152 in the lower arm of a pitman arm 154; and pins 156 and 158, tightly mounted within the end of the pin 150, extend within openings in ear members 160 and 162 which extend outwardly from the lower arm of said pitman arm. Compression springs 164 and 166 sleeved over the pins 156 and 158 respectively serve to bias the pin 150 to the center of the opening 152 and this operation serves to maintain the valve members of the motor 100 in the relative positions disclosed in Figure 5. Completing the description of the mechanism disclosed in Figure 3, the upper portion of the pitman arm 154 is provided with arms 168 and 170 having openings in their ends to receive a pin 66'; and the pitman arm is pivotally mounted on stub shaft 172 extending from and fixedly secured to the shaft 14'.

Describing now the operation of the mechanism disclosed in Figure 3 and completing the description of certain parts of said mechanism when the driver wishes to effect a right turn operation of the front wheels he rotates the steering wheel to the right, that is, clockwise. Now in effecting this operation if the resistance to movement of the front wheels is relatively light, then the pitman arm 154 and lever 92 will move as a unit; and there will be no relative movement of the valve members 30 and 44 to open said valve. Accordingly, the steering mechanism is by this operation actuated solely by the physical effort of the driver. If, however, there is an appreciable resistance to movement of the steering wheels for example when said wheels are mired, then the spring 166 will be compressed in the above described right turn operation of the mechanism; and this operation results in an opening of the valve 30, 44 of the motor unit 100 of Figure 4 assuming for the purpose of this description that this unit is combined with the linkage of Figure 3. Now this motor unit 100 includes the two motors 102 and 104. Accordingly, when the motor 104 is energized, as described above, the motor 102 is energized immediately thereafter. The area of the piston 114 of the motor 104 is equal to or substantially equal to the area of the piston 116 of the motor 102; accordingly, the force exerted by the motor unit 100 is double that exerted by the motor 10; and this is a particularly desirable feature in the power steering mechanism for large busses and trucks for said vehicles require a considerable force to turn the front wheels when the same are mired. The relatively long yet small diametered unit 100 is particularly adapted to be mounted alongside the chassis frame of the aforementioned busses and trucks.

As with the mechanism of Figure 2, the mechanism of Figure 3 provides means for effecting a follow-up operation of the control valve, and after the lost motion between the pin 150 and the opening 152 is taken up then the linkage of Figure 3 provides a mechanism whereby the physical effort of the driver may be added to the then existing power load effected by the motor unit 100. If the latter unit should fail of operation, then the wheels may be operated solely by the physical effort of the driver.

When the right turn steering operation has been completed then the driver will release his grip upon the steering wheel whereupon the spring 166 will tend to operate the control valve to return the parts thereof to the relative positions disclosed in Figure 5. Incidentally, it is to be noted here that the strength of the caster springs 142 and 144 is insufficient to effect an operation of the valve, it being their function merely to aid the caster operation of the front wheels.

There is thus provided by the two embodiments of my invention disclosed in Figures 2 and 3, a simple and compact force transmitting linkage interconnecting the power element of a differential pressure motor, the control valve of said motor, a steering wheel operated worm and sector gearing mounted at the base of a steering column, and a pitman arm, said gearing and pitman arm constituting parts of the steering mechanism of most of the automotive vehicles of the day. With both of the mechanisms of Figures 2 and 3 there is provided a manually operated crank paralleling the pitman arm of the steering mechanism, said parts serving to operate the control valve of the motor of the mechanism; and with both of the mechanisms of Figures 2 and 3 there is provided a simple and compact linkage for operating a follow-up control valve; for effecting a concurrent manual and power operation of the steering mechanism; and for effecting a manual operation of said mechanism in the event of the failure of the power means of said mechanism. In addition to the above features the mechanism of Figure 2 is constructed to provide what is known in the art as feel. In other words, said mechanism is so operative that during the steering operation the driver, by contributing a proportional part of the force necessary to effect the steering movement of the front wheels, is at all times conscious of the degree of force being exerted by said power means.

Although a particular embodiment of my invention has been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. In an automotive vehicle provided with two wheels by which the vehicle is steered and further provided with a source of suction, means for moving the wheels for steering either manually or by power or both, said means including a steering wheel, a reduction gearing operable by the steering wheel, a pitman arm, a drive shaft operated by said reduction gearing, the pitman arm being rotatably mounted on a portion thereof, a crank drivably connected to said shaft and paralleling said pitman arm, a vacuum operated motor, fluid transmitting means interconnecting the motor with the source of suction, a two part control valve mounted within said motor, force transmitting means interconnecting one part of said control valve with the pitman arm and other force transmitting means interconnecting the other part of the control valve with the crank.

2. In an automotive vehicle provided with two wheels by which the vehicle is steered and further provided with a source of suction, means for moving the wheels for steering either manually or by power or both, said means including a steering wheel, a reduction gearing operable by the steering wheel, a pitman arm, a drive shaft operated by said reduction gearing, the pitman arm being rotatably mounted on a portion thereof, a crank drivably connected to said shaft and paralleling said pitman arm, a flange member secured to the end of the crank and extending laterally thereof toward the pitman arm, a vacuum operated motor, fluid transmitting means interconnecting the motor with the source of suction, a two part control valve mounted within said motor, force transmitting means interconnecting one part of said control valve with the pitman arm and other force transmitting means interconnecting the other part of the control valve with aforementioned flange member.

3. In an automotive vehicle provided with two wheels by which the vehicle is steered and further provided with a source of suction, means for moving the wheels for steering either manually or by power or both, said means including a steering wheel, a reduction gearing operable by the steering wheel, a pitman arm, a drive shaft operated by said reduction gearing, the pitman arm being rotatably mounted on a portion thereof, a crank drivably connected to said shaft and paralleling said pitman arm, a vacuum operated motor, fluid transmitting means interconnecting the motor with the source of suction, a two part control valve mounted within said motor, force transmitting means, including a tube connected to the source of suction, interconnecting one part of said control valve with the outer end of said crank, and other force transmitting means interconnecting the other part of the control valve with the pitman arm, said latter force transmitting means including a hollow rod, two link members connected to one end of the rod and a plurality of lever members pivotally connected to said link members and to the upper end of the pitman arm.

4. Manually and power operated steering mechanism adapted for use in an automotive vehicle, said mechanism including a manually operated drive shaft including a stub shaft portion at its end, a crank mounted adjacent one end of said shaft and drivably connected thereto, a pitman arm rotatably mounted on said stub shaft portion and paralleling the aforementioned crank, a double acting pressure differential operated motor, a two part control valve mounted within said motor, force transmitting means interconnecting the crank with one of the two parts of the control valve, force transmitting means, including two reaction levers interconnecting the other part of the control valve with the pitman arm, and a pin interconnecting said levers with the crank and operable to resist the valve opening movement of said crank.

5. Manually and power operated steering mechanism adapted for use in an automotive vehicle, said mechanism including a manually operated drive shaft including a stub shaft portion at its end, a crank mounted adjacent one end of said shaft and drivably connected thereto, a pitman arm rotatably mounted on said stub shaft portion and paralleling the aforementioned crank, a double acting pressure differential operated motor, a two part control valve mounted within said motor, force transmitting means interconnecting the crank with one of the two parts of the control valve, force transmitting means, including two reaction levers interconnecting the other part of the control valve with the pitman arm, said levers being connected with one end of the pitman arm by a pin which extends through said arm and into adjacent ends of the levers, and a pin interconnecting said levers with the crank and operable to resist the valve opening movement of said crank, said latter pin extending through an opening in the pitman arm.

6. Manually and power operated steering mechanism adapted for use in an automotive vehicle, said mechanism including a manually operated drive shaft including a stub shaft portion at its end, a two armed crank mounted adjacent one end of said shaft and drivably connected thereto, a pitman arm rotatably mounted on said stub shaft portion and paralleling the aforementioned crank, a double acting pressure differential operated motor, a two part control valve mounted within said motor, force transmitting means interconnecting the crank with one of the two parts of the control valve, a pin extending laterally from the end of the lower arm of the crank and through an opening in the pitman arm, force transmitting means interconnecting the pitman arm with the other part of the two part control valve and means, including yieldable means, interconnecting the pitman arm with the aforementioned laterally extending pin.

7. Manually and power operated steering mechanism adapted for use in an automotive vehicle, said mechanism including a manually operated drive shaft, a two armed crank mounted adjacent one end of said shaft and drivably connected thereto, a pitman arm rotatably mounted on a portion of said shaft and paralleling the aforementioned crank, a double acting pressure differential operated motor, a two part control valve mounted within said motor, force transmitting means interconnecting the crank with one of the two parts of the control valve, a pin extending laterally from the end of the lower arm of the crank and through an opening in the pitman arm, force transmitting means interconnecting the pitman arm with the other part of the two part control valve, and means, including two ears projecting laterally from the pitman arm, pin members extending laterally from the aforementioned pin, and springs sleeved over the pin member, interconnecting the pitman arm with the aforementioned laterally extending pin.

8. Manually and power operated steering mechanism adapted for use in an automotive vehicle to effect the steering operation of the front wheels thereof, said mechanism including a manually operated drive shaft, a two armed crank member drivably connected to a portion of said shaft adjacent one end thereof, a drive pin secured to and extending laterally from one arm of said crank, a flange member secured to and extending laterally from the other arm of said crank, said flange member paralleling the drive pin, a pitman arm rotatably mounted on a portion of the shaft and paralleling the crank, the aforementioned drive pin extending through an opening in said pitman arm, a pressure differential operated motor, a two part control valve mounted within said motor and force transmitting means, including a lost motion connection, interconnecting the end of the aforementioned flange with one of the parts of the two part valve member and interconnecting one end of the pitman arm with the other part of said valve member.

9. Manually and power operated steering mechanism adapted for use in an automotive vehicle to effect the steering operation of the front wheels thereof, said mechanism including a manually operated drive shaft, a two arm crank member drivably connected to said shaft adjacent one end thereof, a drive pin secured to and extending laterally from one arm of said crank, a flange member secured to and extending laterally from the other arm of said crank, said flange member paralleling the drive pin, a pitman arm rotatably mounted on a portion of the shaft and paralleling the crank, the aforementioned drive pin extending through an opening in said pitman arm, a pressure differential operated motor, a two part control valve mounted within said motor, force transmitting means interconnecting the flange member and one part of the valve, other force transmitting means interconnecting one end of the pitman arm and the other part of the valve, ear members projecting laterally from the lower part of the pitman arm, and means, including yieldable means, interconnecting said ear members with the aforementioned drive pin.

10. Manually and power operated steering mechanism adapted for use in an automotive vehicle to effect the steering operation of the front wheels thereof, said mechanism including a manually operated drive shaft, a crank member drivably connected to the drive shaft, a pressure differential operated motor, a two part control valve for said motor, a pitman arm rotatably mounted on the end portion of the shaft and paralleling the crank, two reaction levers straddling the upper arm of the pitman arm, said levers being pivotally connected to the latter arm by a pin member, force transmitting means, including a lost motion connection, interconnecting the two parts of the control valve with the lever members and the crank and a pin member serving to interconnect the crank with the levers, said pin member extending through an opening in the pitman arm.

HAROLD W. PRICE.

REFERENCES CITED

The following references are of record in the file of this patent:

UNITED STATES PATENTS

| Number | Name | Date |
|---|---|---|
| 2,022,698 | Vickers | Dec. 3, 1935 |
| 2,048,978 | Tait | July 28, 1936 |
| 2,341,502 | Ingres | Feb. 8, 1944 |
| 2,413,380 | Rush et al. | Dec. 31, 1946 |